(12) United States Patent
Chen et al.

(10) Patent No.: US 6,407,912 B1
(45) Date of Patent: Jun. 18, 2002

(54) COMPUTER ENCLOSURE WITH FASTENER

(75) Inventors: Yun Lung Chen; Kuo Chih Lin; Jung Chi Chen, all of Taipei (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/753,441

(22) Filed: Jan. 3, 2001

(51) Int. Cl.[7] ............................................... G06F 1/16
(52) U.S. Cl. ................................. 361/683; 312/223.1
(58) Field of Search ............................. 361/679, 683, 361/724–727; 312/8.13–8.15, 223.1, 223.2, 223.3, 332.1, 351

(56) References Cited

U.S. PATENT DOCUMENTS

| | | | |
|---|---|---|---|
| 5,162,976 A | * 11/1992 | Moore et al. | 361/393 |
| 5,845,978 A | * 12/1998 | Jung | 312/244 |
| 5,967,633 A | * 10/1999 | Jung | 312/223.2 |
| 6,025,989 A | * 2/2000 | Ayd et al. | 361/695 |
| 6,231,144 B1 | * 5/2001 | Chen et al. | 312/332.1 |
| 6,272,005 B1 | * 8/2001 | Jensen et al. | 361/680 |

* cited by examiner

Primary Examiner—Darren Schuberg
Assistant Examiner—Yean-Hsi Chang
(74) Attorney, Agent, or Firm—Wei Te Chung

(57) ABSTRACT

A computer enclosure includes a chassis (10) with a support bracket (20), a hood (40) and a fastener (60) securing the hood to the chassis. The fastener includes a handle (62) pivotably attached to the hood, an elastic latch (64) inserted into an aperture (56) of the hood to retain the handle on the hood, and a torsion spring (68) compressed between the handle and the hood. The handle includes a press portion (74) and two cams (72). The cams extend through a cutout (25) of the hood, and act on a flange (29) of the bracket. The hood is thereby attached to the bracket. When the press portion is pressed, the latch exits the aperture. The spring deforms back to its uncompressed shape, causing the handle to rotate up from the hood. The cams act on a stop plate (27) of the bracket, and disengage from the cutout.

10 Claims, 5 Drawing Sheets

COMPUTER ENCLOSURE WITH FASTENER

BACKGROUND OF THE INVENTION

1. Field of the Invention

The present invention relates to a computer enclosure, and particularly to a computer enclosure having a hood readily attached thereto and detached therefrom by means of a fastener.

2. Related Art

A conventional computer enclosure generally includes a chassis, a hood and a bezel. The chassis is used to hold components such as motherboards, interface cards, a power supply and disk drives. The chassis is generally U-shaped, and comprises a base, a front panel and a rear panel. The hood is also U-shaped, and has a top panel and two opposite side panels depending from the top panel. The hood is slidingly attached to the chassis along rails formed on opposite sides of the chassis, and then secured to the rear panel with screws. Finally, the bezel is mounted on the front panel.

Securing the hood to the rear panel with screws is unduly complicated and time-consuming. Furthermore, it is difficult to simultaneously align both side edges of the hood with the respective rails of the chassis.

Another kind of conventional hood is secured to a chassis by means of engagement of locking catches of the hood with slots of the chassis. However, disengaging this kind of hood from the chassis is complicated and laborious.

The above related art includes U.S. Pats. Nos. 5,159,528, 5,164,886, 5,271,152, and 5,491,611.

It is strongly desired to provide a computer enclosure which overcomes the above problems encountered in the related art.

SUMMARY OF THE INVENTION

Accordingly, an object of the present invention is to provide a computer enclosure which has a fastener for readily mounting a hood to the enclosure and readily removing the hood therefrom.

To achieve the above-mentioned object, a computer enclosure in accordance with the present invention comprises a chassis, a support bracket mounted in the chassis, a hood and a fastener securing the hood to the support bracket. The support bracket defines a cutout in a top panel thereof. A flange and a stop plate depend from the top panel on opposite sides of the cutout. The hood forms a recess portion comprising a bottom wall with two slots defined therein, a pair of side walls, and a front wall defining an aperture therein. The fastener comprises a handle pivotably attached to the hood, an elastic Y-shaped latch, and a torsion spring. The handle has a press portion, and two cams extending through the two slots. When the handle is rotated downwardly, the cams extend through the cutout and act upon the flange, the latch snaps into the aperture, and the spring is compressed between the handle and the recess portion. The hood is thus securely attached to the chassis.

The latch defines a notch therein. The press portion has a projection with a slope. When the press portion is downwardly pressed, the projection enters the notch and the slope pushes the latch backward. The latch exits the aperture of the hood, and the spring deforms back to its original shape. This causes the handle to rotate up from the support bracket. The cams act on the stop plate of the support bracket, and disengage from the cutout. The hood is thereby released from the support bracket.

Other objects, advantages and novel features of the present invention will be drawn from the following detailed description of the preferred embodiment of the present invention with reference to the attached drawings, in which:

DESCRIPTION OF THE PREFERRED EMBODIMENT

Figure 1:
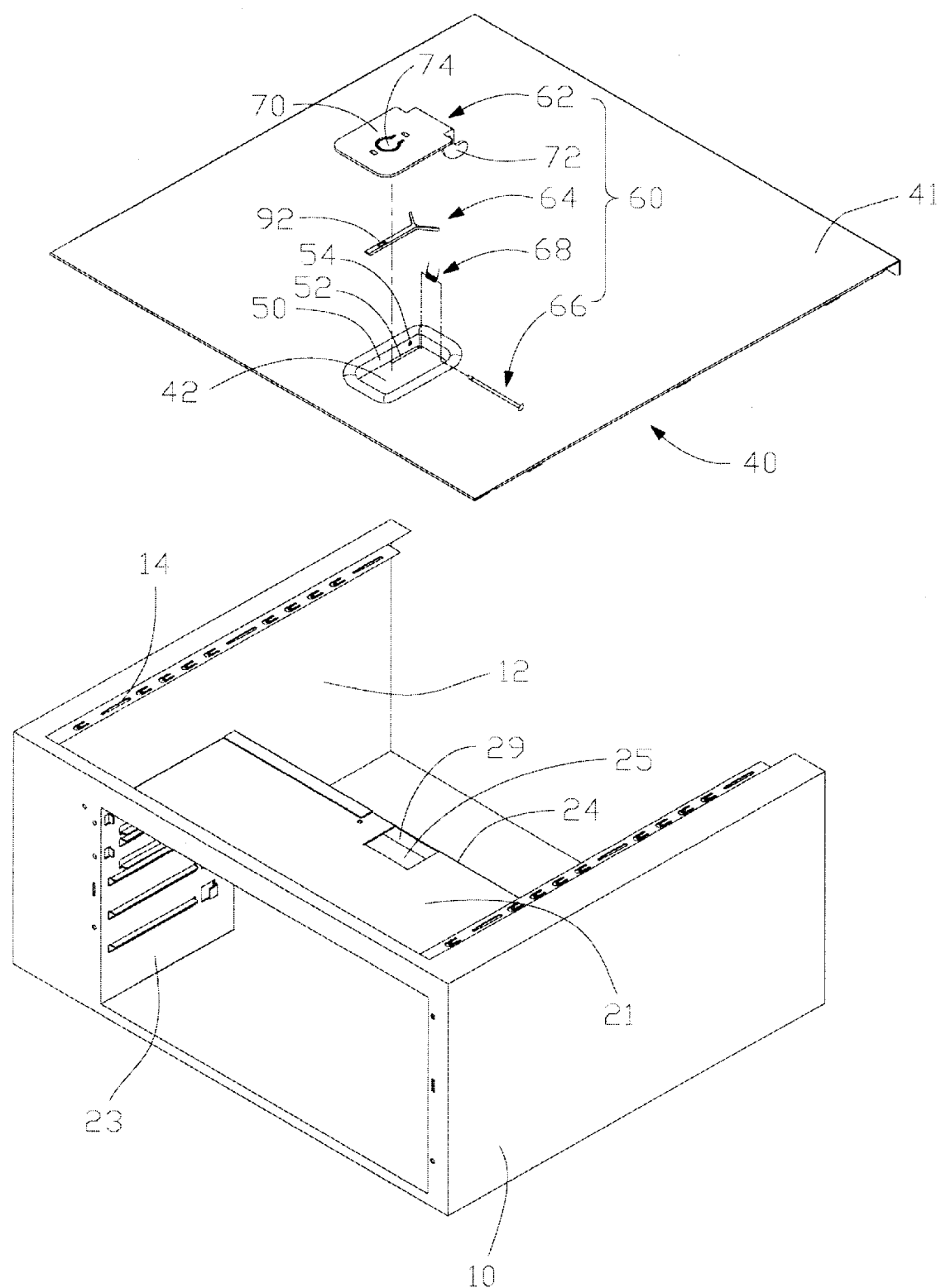
FIG. 1 is an exploded view of a computer enclosure in accordance with the present invention.
Figure 2:
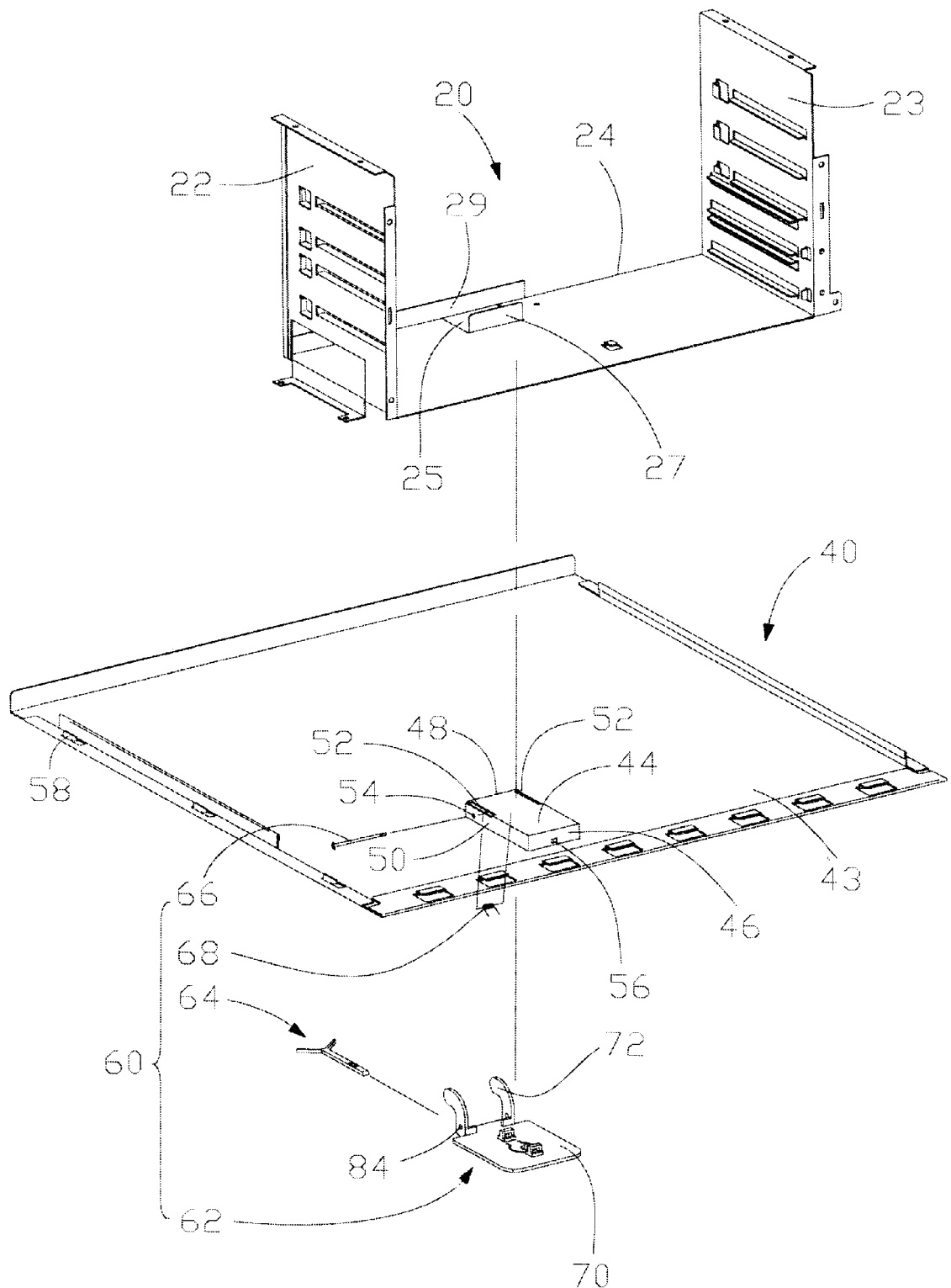
FIG. 2 is an inverted view of a support bracket, a hood and a fastener of the computer enclosure of FIG. 1.

Referring to FIGS. 1 and 2, a computer enclosure in accordance with the present invention comprises a chassis 10, a support bracket 20, a hood 40, and a fastener 60 attaching the hood 40 to the support bracket 20.

The chassis 10 comprises a pair of side walls 12. Each side wall 12 defines a plurality of grooves 14 in an upper portion thereof.

The support bracket 20 is secured in the chassis 10, and comprises a top panel 21 with a rear edge 24, a first side panel 22 depending from a side edge of the base 21, and a second side panel 23 depending from an opposite side edge of the base 21. A cutout 25 is defined in the top panel 21, adjacent the rear edge 24. A flange 29 depends from the rear edge 24, adjacent the cutout 25. A stop plate 27 depends from an edge of the top panel 21 adjacent the cutout 25 and opposite to the rear edge 24.

The hood 40 is a generally rectangular plate, and has a top surface 41 and a bottom surface 43. The top surface 41 is stamped downwardly to form a generally box-shaped recess portion 42. The recess portion 42 comprises a bottom wall 44, a front wall 46, a rear wall 48 and a pair of side walls 50. A pair of slots 52 is respectively defined in opposite sides of the bottom wall 44, adjacent the side walls 50. A pair of first pivot holes 54 is respectively defined in the pair of side walls 50, near the rear wall 48. An aperture 56 is defined in the front wall 46. A plurality of hooks 58 is formed on opposite sides of the bottom surface 43 of the hood 40, corresponding to the grooves 14 of the chassis 10.

Figure 3:
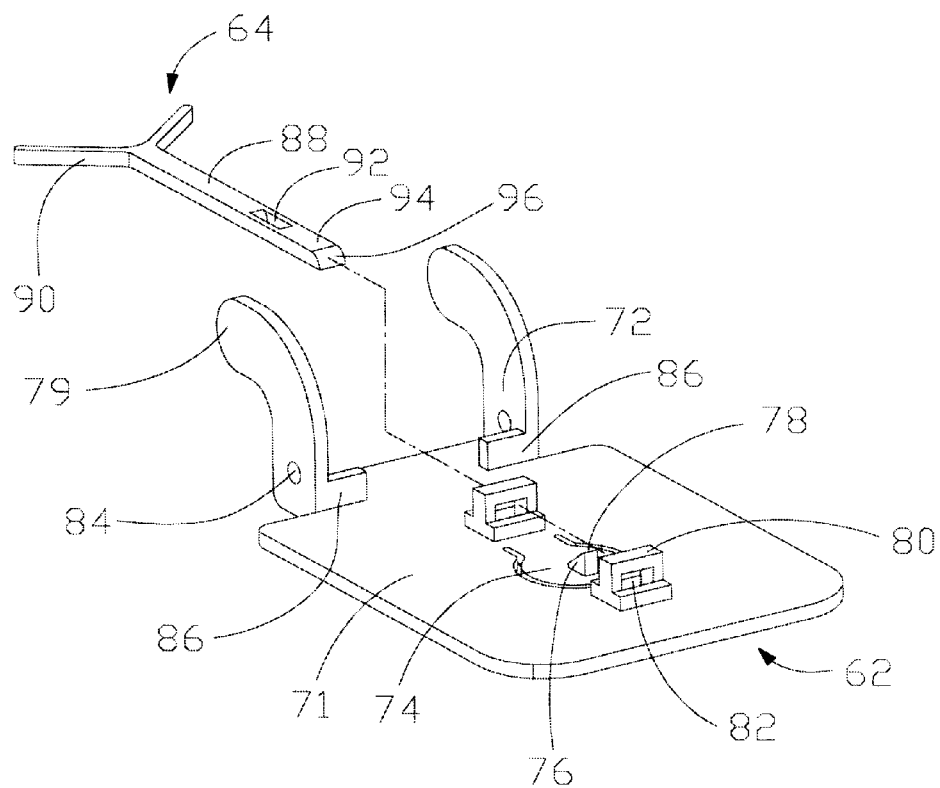
FIG. 3 is an exploded view of a handle and a latch of the computer enclosure of FIG. 1.

Referring also to FIG. 3, the fastener 60 comprises a handle 62, an elastic Y-shaped latch 64, a pivot pin 66, and a torsion spring 68. The handle 62 comprises a base 70 with a lower surface 71, and a pair of cams 72 extending from one side edge of the base 70. A press portion 74 is formed in a central part of the base 70. A projection 76 is formed on the lower surface 71 of the press portion 74. A first slope 78 is formed on the projection 76, generally facing the cams 72. A pair of protrusions 80 depends from the lower surface 71, on opposite sides of the press portion 74. Each protrusion 80 defines an opening 82 therethrough. Each cam 72 comprises a curved end 79. The cams 72 respectively define a pair of second pivot holes 84 therein, corresponding to the pair of first pivot holes 54 of the hood 40. A pair of stop tabs 86 respectively extends inwardly toward each other from the junctions of the cams 72 and the lower surface 71.

The Y-shaped latch 64 comprises a body 88, and a pair of elastic fingers 90 extending from one end of the body 88. A notch 92 is defined in the body 88, corresponding to the projection 76 of the handle 62. A second slope 96 is formed on a free end 94 of the body 88, the free end 94 being opposite to the fingers 90.

Figure 4:
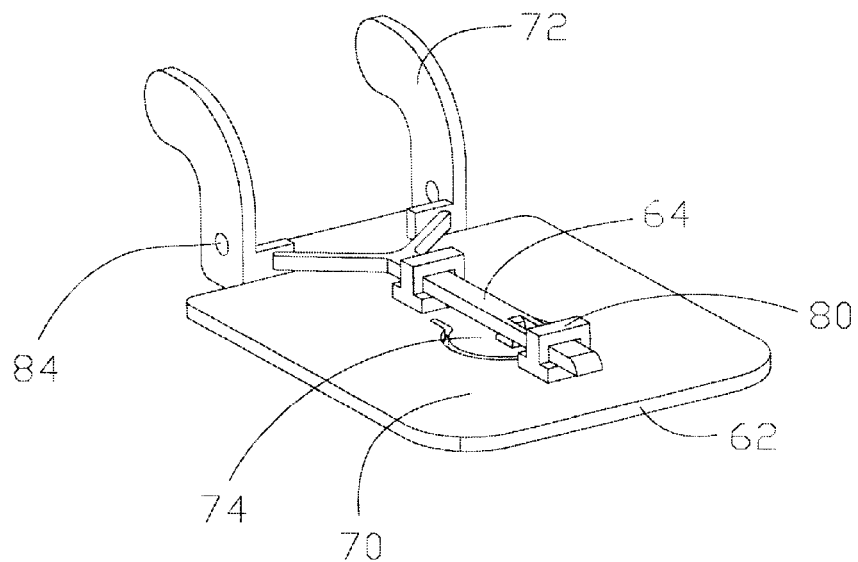
FIG. 4 is an assembled view of FIG. 3.
Figure 5:
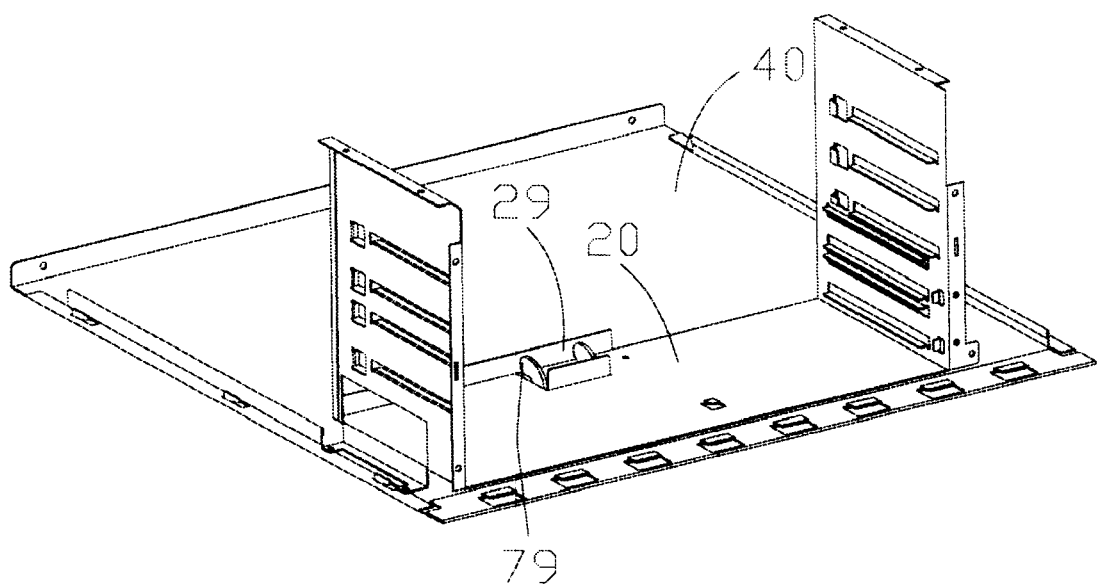
FIG. 5 is an assembled view of FIG. 2.
Figure 6:
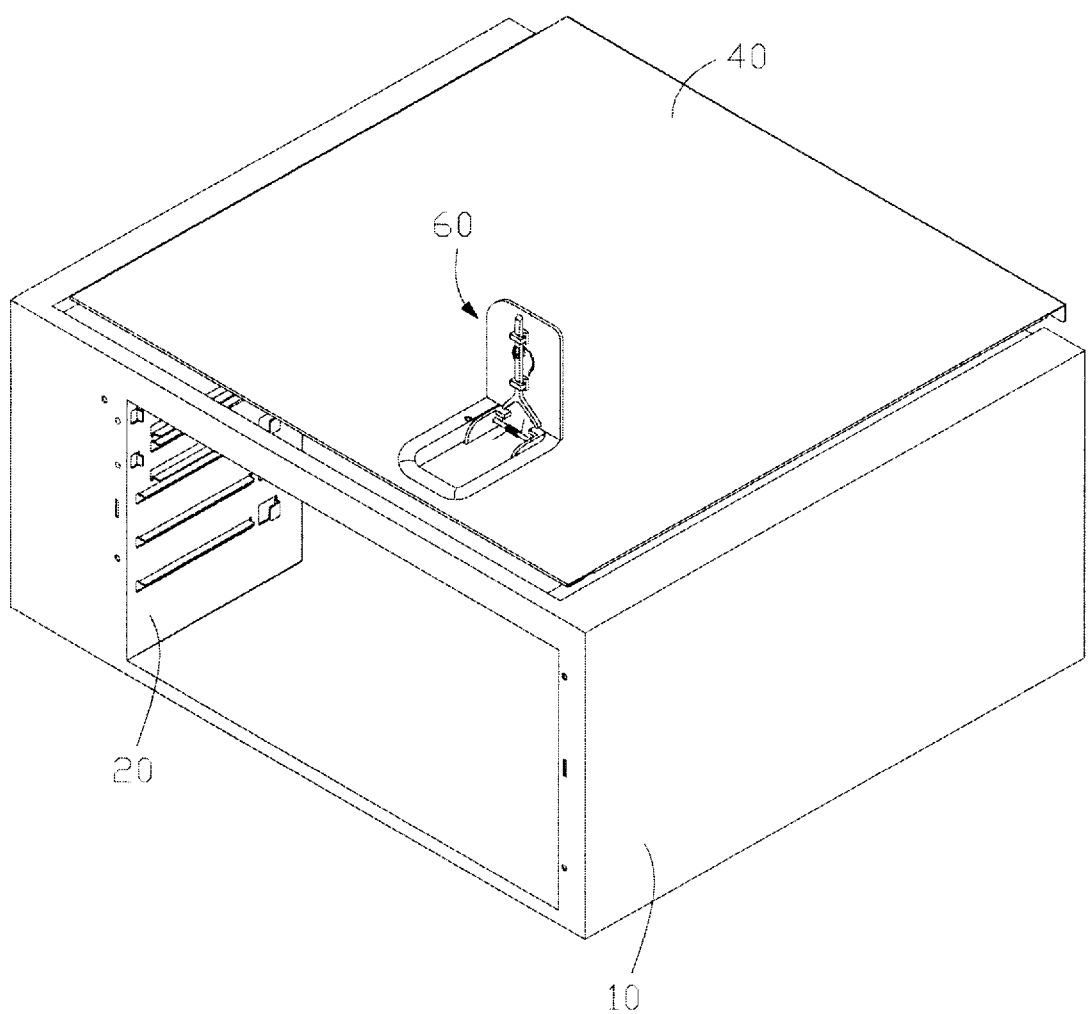
FIG. 6 is a partly-assembled view of FIG. 1.

Referring also to FIGS. 4–6, in assembly, the latch 64 is attached to a lower side of the handle 62. The body 88 of the latch 64 is extended through the openings 82 of the protrusions 80 of the handle 62. The fingers 90 of the latch 64 respectively abut against the stop tabs 86 of the handle 62. The handle 62 with the latch 64 attached thereunder is then placed vertically on the recess portion 42 of the hood 40. The cams 72 of the handle 62 are respectively extended through the slots 52 of the hood 40. The pin 66 is then extended through one first pivot hole 54 of the handle 40, one second pivot hole 84 of the handle 62, the torsion spring 68, the other second pivot hole 84 and finally the other first pivot hole 54. Thus the fastener 60 is secured on the hood 40. The handle 62 is perpendicular to the hood 40, and the torsion spring 68 is in its original shape.

The hood 40 with the fastener 60 attached thereon is slidably mounted onto the chassis 10. The hooks 58 of the hood 40 are respectively inserted into the grooves 14 of the chassis 10. The handle 62 is then rotated from the vertical position to a horizontal position. The curved ends 79 of the cams 72 of the handle 62 eventually abut against the flange 29 of the support bracket 20 (see FIG. 5). The handle 62 is continued to be rotated, causing the curved ends 79 to rotate against the flange 29. This forces the hood 40 to move forward until it completely covers the chassis 10. The second slope 96 of the latch 64 of the handle 62 snaps over an upper portion of the front wall 46 of the recess portion 42 of the hood 40. The free end 94 of the handle 62 then snaps into the aperture 56 of the front wall 46. The base 70 of the handle 62 is now parallel to the hood 40. The torsion spring 68 is compressed between the base 70 of the handle 62 and the bottom wall 44 of the recess portion 42. Thus the hood 40 is securely mounted on the chassis 10.

In disassembly, the press portion 74 of the handle 62 is pressed downwardly. The projection 76 of the handle 62 enters the notch 92 of the latch 64 of the handle 62. The first slope 78 of the projection 76 acts on the latch 64, thereby pushing the body 88 of the latch 64 backward. The free end 94 of the latch 64 exits the aperture 56 of the front wall 46 of the hood 40. Thereupon the torsion spring 68 deforms back to its original shape, and thereby causes the handle 62 to rotate back to its original vertical position. The curved ends 79 of the cams 72 move away from the flange 29 of the support bracket 20, thereby releasing the hood 40 from the support bracket 20. During the rotation of the handle 62, convex edges (not labeled) of the cams 72 movingly abut against the stop plate 27 of the support bracket 20. The hood 40 is thereby forced to move backward slightly (see FIG. 6). The hood 40 is then easily removed from the enclosure 10.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
   a chassis with a support bracket mounted therein, the support bracket having a cutout defined therein and a flange; and
   a hood attached to the chassis, the hood having a recess portion, the recess portion defining an aperture and at least one slot therein; and
   a fastener securing the hood on the chassis, the fastener comprising a handle pivotably attached to the recess portion, an elastic latch movably at ached to the handle for engaging with the aperture of the hood to retain the handle on the hood, and an elastic member compressed between the handle and the hood, the handle having at least one cam extending through the at least one slot of the recess portion and the cutout of the support bracket to abut the flange, thereby securing the hood on the chassis.

2. The computer enclosure as claimed in claim 1, wherein the handle further has a press portion, and when the press portion is downwardly pressed the latch is pushed backward to exit the aperture of the hood and the elastic member deforms back to its uncompressed shape, thereby causing the handle to rotate up and every cam of the handle to disengage from the cutout of the support bracket, thereby releasing the hood from the chassis.

3. The computer enclosure as claimed in claim 2, wherein the press portion of the fastener has a projection with a first slope, and the latch defines a notch therein, and wherein when the press portion is downwardly pressed, the projection enters the notch and the first slope acts on the latch, thereby pushing the latch backward.

4. The computer enclosure as claimed in claim 3, wherein the latch forms a second slope on a free end thereof, for facilitating entry of the latch into the aperture of the hood.

5. The computer enclosure as claimed in claim 1, wherein the handle has a plurality of stop tabs, and the latch has a pair of fingers for abutting against the stop tabs.

6. The computer enclosure as claimed in claim 1, wherein the recess portion comprises a front wall, and wherein the aperture is defined in the front wall.

7. The computer enclosure as claimed in claim 1, wherein the recess portion comprises a bottom wall, and wherein each slot is defined in the bottom wall.

8. The computer enclosure as claimed in claim 1, wherein the recess portion comprises a pair of opposite side walls, at least one side wall defines a first pivot hole therein, each cam of the handle defines a second pivot hole therein, and at least one pin extends through the first and second pivot holes and the elastic member, thereby pivotably attaching the handle to the hood.

9. The computer enclosure as claimed in claim 1, wherein a stop plate depends from an edge of the support bracket adjacent the cutout and opposite to the flange, for abutting against each cam of the handle.

10. The computer enclosure as claimed in claim 1, wherein the elastic member is a torsion spring.

* * * * *